Feb. 21, 1939.  F. L. AYERS  2,148,336
MANUFACTURE OF MULTI-PLY COUNTERS
Filed June 28, 1938
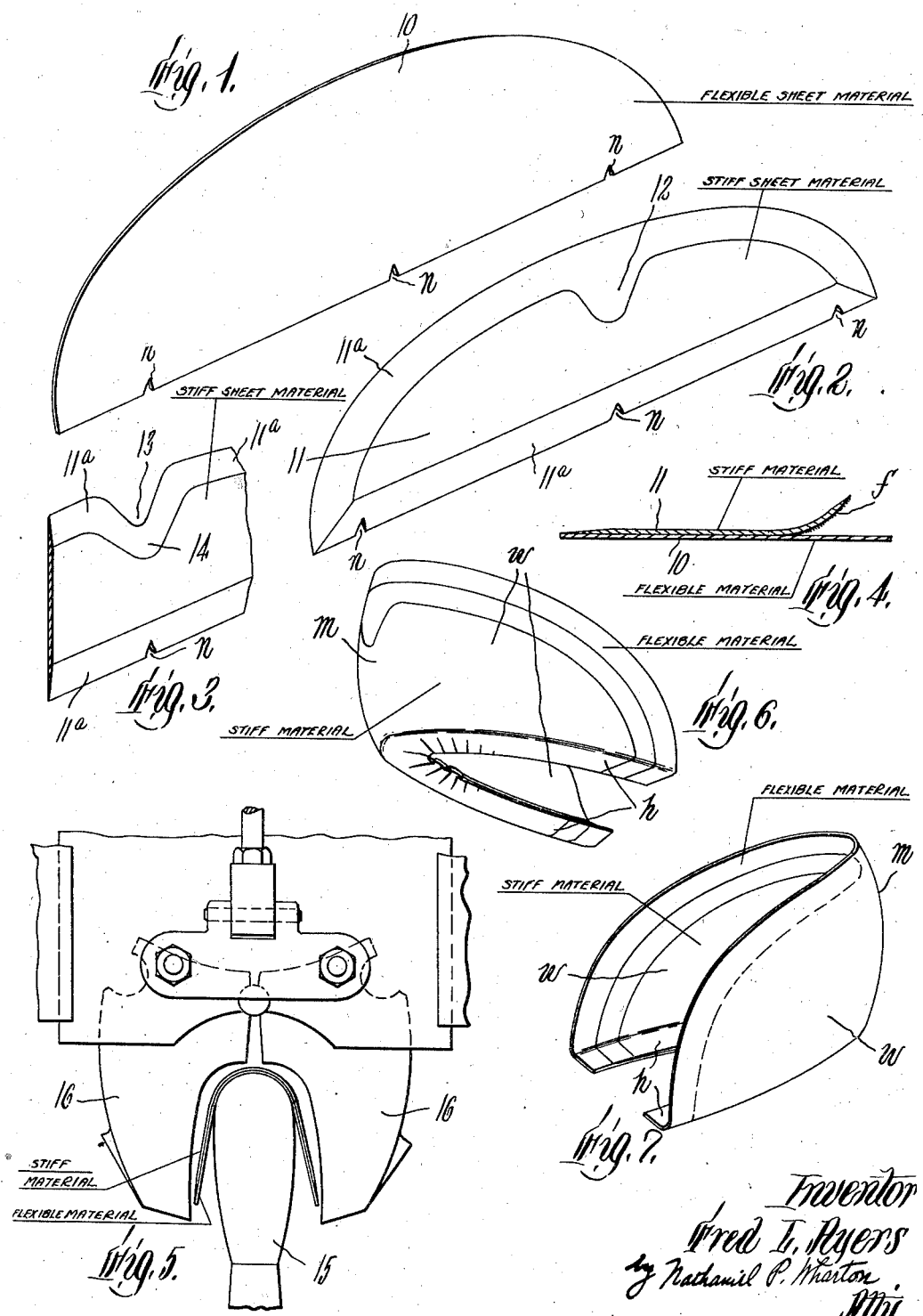

Patented Feb. 21, 1939

2,148,336

UNITED STATES PATENT OFFICE 2,148,336

MANUFACTURE OF MULTI-PLY COUNTERS

Fred L. Ayers, Watertown, Mass., assignor to Brown Company, Berlin, N. H., a corporation of Maine Application June 28, 1938, Serial No. 216,236

6 Claims. (Cl. 12—146)

This invention relates to the manufacture of a multi-ply counter and more especially a counter structure comprising a ply of relatively stiff sheet material and a ply of relatively flexible sheet material.

In accordance with the present invention, a counter of the foregoing type is made by cutting the stiff ply material into a counter blank, separately cutting the flexible ply material into a larger sized counter blank, and molding the blanks in appropriately superposed relationship after cement has been applied between their contacting surfaces but before such cement has set or permanently bonded them together. The smaller or relatively stiff blank is preferably skived at its margins before being plied and molded with the larger or relatively flexible blank, whose disposition relative to the smaller blank is such that its marginal portions, excepting its bottom margin, extend substantially beyond the corresponding edges of the smaller blank and hence provide the flexible edges desired in the finished or molded counter structure.

Because the two plies of the counter structure hereof are permanently bonded together only during the molding operation and/or after the molding operation has been completed, the plies are free to undergo the desired relative creeping movement or displacement tending to occur during the molding operation, in consequence of which it is possible readily to produce a shaped or molded counter structure of the desired finished configuration, that is, a configuration more faithfully or accurately representative of the mold than otherwise. When the two plies are permanently bonded or cemented together before molding, it is difficult to realize a finished or molded counter structure of the desired configuration or shape, particularly when the outer ply of the counter consists of the stiff or firm ply, as is usually desired. This difficulty in realizing the desired molded shape of the permanently prebonded plies, especially when the outer ply of the counter is to be the stiff or firm ply, arises from the tendency for the outer ply to creep or move during the molding operation relative to the inner or flexible ply; and, inasmuch as such creep of the outer ply is inhibited by the permanent bond between the two plies, the molded counter, upon removal from the mold, does not permanently hold the shape or form supposed to have been permanently acquired thereby in the mold. Moreover, when stiff and comparatively non-stretchable material of the nature of fiberboard constitutes the outer ply of the permanently prebonded, plied, counter-blank structure being molded, the tendency for such outer ply to creep is not compensated in sufficient measure by stretching of such ply. Accordingly, it is for this reason also that the molded counter as it emerges from the mold is apt to be improperly shaped.

The method of the present invention hence does away with the difficulty of molding to the desired final shape a two-ply counter structure of the kind described even when such structure comprises as its outer ply stiff and comparatively non-stretchable material of the nature of fiberboard, since the two plies are not permanently bonded together during the molding operation and the outer stiff ply is hence free to undergo such creeping or other movement relative to the inner ply as may tend to occur during the conformation of the flat, plied, counter-blank structure to the mold. Again, the method hereof enables the skiving of the stiff ply or blank independently of the comparatively flexible ply or blank, which, when it serves as a bonded backing for the stiff ply, detracts from the best or most accurate skiving of the stiff ply.

With the foregoing and other features and objects in view, the present invention will now be described in further detail with particular reference to the accompanying drawing, wherein, Figure 1 shows in perspective the cut or died-out blank of flexible ply material.

Figure 2 is a similar view of the cut or died-out blank of stiff ply material after its margins have been skived.

Figure 3 is a fragmentary perspective of only the back part of a stiff ply blank skived somewhat differently from the blank of Figure 2.

Figure 4 represents a transverse section through the superposed blanks of Figures 1 and 2 just before they are molded or while they are being molded, a marginal portion of one of the plies being raised to show the cement coating thereon.

Figure 5 shows somewhat diagrammatically and conventionally a front elevational view of a counter-molding machine, the presser elements of the mold being about to close down completely on the superposed plied structure of Figure 4.

Figure 6 depicts in perspective a finished or molded counter producible by the method hereof and comprising a stiff outer ply.

Figure 7 similarly shows a modified form of counter producible by the method hereof and comprising a flexible outer ply.

The flexible blank or ply 10 shown in Figure 1 may be cut from suitable relatively flexible sheet material, for instance, from a rubber-impregnated felted fiber stock of about one-iron thickness (i. e., about $\frac{1}{8}''$ thickness). Although such blank may, if desired, be skived at its edges, yet it may be sufficiently flexible when of one-iron thickness so as not to discomfort the foot even when its edges are left unskived, particularly since its edges are more or less compressed during subsequent molding to the desired thinness.

Such flexible material as is known on the market as "Onco" is particularly suitable for the blank 10, since such material consists of a rubber-impregnated felt or paper of soft and refined wood pulp fibers, e. g. wood pulp of an alpha cellulose content upwards of about 93%, and has particularly good flexibility, stretchability, and compressibility, such as is desired in the blank 10. It is, however, possible to use other appropriately flexible fibrous sheet materials for the blank 10, for instance, a starch-bonded felted fibrous sheet of the character disclosed in Schur and Archer application Serial No. 207,308, filed May 11, 1938.

The stiff ply or blank 11 shown in Figure 2 may be cut from suitable relatively stiff sheet material, such as fiberboard, leatherboard, or the like containing, if desired, rosin size, starch, or other suitable binders or stiffening agents. Such blank 11 may be of a thickness approximately equal to that of the blank 10 or, if desired, somewhat thicker. The marginal portions 11a of such blank are preferably skived in such manner that the zone of skiving 12 at the back region thereof extends farther inwardly or downwardly than elsewhere and hence conduces to a finished counter affording the desired flexibility and comfort at its back wall, whereat the foot generally bears with greatest pressure. I do not, however, claim as my invention this latter mode of skiving, which is the subject matter of Maclean application Serial No. 188,328, filed February 2, 1938. In some instances, the desired flexibility in the back wall of the finished counter may be realized by skiving the blank 11 so that, as appears in Figure 3, a recess 13 is created centrally at its upper edge and a localized zone of skiving 14 is developed in such blank immediately below such recess and substantially or downwardly inwardly of the upper marginal areas 11a. It might be noted that the blank 10 is appreciably larger than the skived blank 11, since its marginal portions are intended to project beyond the skived marginal portions of the blank 11, excepting at the bottom edges of both blanks, which may be made substantially to coincide prior to the counter-molding operation.

The assembly or superposition of the two blanks 10 and 11 with suitable cement or adhesive therebetween may be effected immediately before or in the course of the molding operation. In any event, cement is first applied to a face of at least one of the blanks, for instance, to the face $f$ of the relatively stiff blank to contact with the relatively flexible blank 10. The two blanks are then superposed with their lower edges in substantial coincidence, as shown in Figure 4, and with the central points of such edges, which may be defined as by notches $n$, also in substantial coincidence, wherefore the various edge portions of the relatively flexible blank, excepting the bottom edge, project appreciably beyond the corresponding edges of the relatively stiff blank. As thus superposed immediately before transfer to, or while on, the base mold 15 of a counter-molding machine, the superposed blanks are subjected to the shaping or conforming pressure of the presser or shaping elements 16 of the machine, which, as they close down against the base mold 15, impart to the superposed or plied blanks the desired finished counter shape or configuration illustrated in Figure 6 and comprising, as usual, the side walls or wings $w$, the back $m$, and the bottom or heel flange $h$. It might be noted that in preparing the two blanks or plies 10 and 11 for plying and molding, it is generally desirable to soften them markedly by soaking or "mulling" in water for an appropriate period of time, the particular time depending on the particular characteristics of the materials of such blanks and ranging from, say, a few minutes to an hour or more. In some instances, steam may be used as the medium for softening or "mulling" the blanks. The cement or adhesive applied between the two blanks may consist of such water-compatible material as rubber latex, aqueous gum or glue solution, cooked aqueous starch paste, or the like, which may be spread or daubed substantially uniformly on either or both faces of the blanks to be brought into contact immediately before or in the course of the molding operation. It is generally preferable that immediately after such application of adhesive, the blanks be assembled or superposed in proper relationship directly on the base mold 15 while at the same time roughly or approximately conforming the blanks by hand to the shape of such mold so that relative creeping movement between the two blanks or plies may be caused to take place even before the presser elements 16 of the molding machine are brought down against the superposed or plied blanks to impart thereto the desired final counter shape. The presser elements 16, which may be in cold or heated condition, ensure the desired tenacity of adhesive union or bond between the two blanks or plies as they are being pressed to final counter shape. When hot, they also promote a complete setting of the cement or adhesive and also a better maintenance of the shape of the molded counter structure upon its removal from the mold. Should the molded counter structure still be appreciably moist after the molding operation, its drying may be completed at room temperature or in a current of hot air, for instance, in a special hot-air drying chamber.

While it is generally preferable to soak or "mull" the blanks in water so as to soften them markedly prior to their superposition and molding, the method hereof is not limited to the humidification or softening of the blanks. When the step of humidifying or softening the blanks is omitted, it is possible to use quick-drying adhesives whose effectiveness is otherwise impaired by the moisture present in the blanks, for instance, such non-aqueous adhesives as the conventional nitro-cellulose or pyroxylin cements, organic solvent solutions of artificial resins, rubber cements, and like materials incompatible with water. So-called dry-sealing cements may also be applied to the surfaces of the two blanks to be united or bonded together. Thus, rubber cement may be applied to both such surfaces, dried thereon, and, after the blanks have been softened or humidified, they may be superposed and bonded together under pressure in the course of their molding, as hereinbefore described, to finished counter shape.

The finished or molded counter shown in Figure 7 is similar to that of Figure 6, excepting that the relatively stiff ply occurs inside or next to the foot and the relatively flexible ply occurs outside. Such a counter is ordinarily less desirable than that of Figure 6, since it is usually preferred that the flexible ply occur next to the foot and hence contribute to maximum foot comfort. The method hereof is, however, applicable advantageously to the production of counters of both types, whose structure comprises a stiff or firm ply bonded to a relatively flexible or soft ply projecting beyond all the preferably skived stiff ply edges, excepting the bottom edge.

The method hereof is subject to change or modification while still falling within the inventive principles hereof as defined by the appended claims. For instance, the two blanks or plies, preferably in humidified or softened condition, may be appropriately coated with adhesive and assembled or superposed on a mold of a contour approximating that of the base mold of the counter-molding machine in which the finished counter is produced. Thus, an operator may assemble and conform the suitably adhesive-treated and preferably humidified blanks over a mold of U-shaped configuration that imparts to the composite or plied structure a U-shape approximating that of the side and back walls of the finished or molded counter. With the adhesive in such approximately molded counter structure still in unset or undried state, the structure may then be transferred to the counter-molding machine, wherein the structure is pressed and molded to the final configuration desired for its incorporation into a shoe upper.

It might be noted that while the method hereof has its greatest practicality or utility when practiced by a counter manufacturer, yet it might also be adopted by the shoemaker himself. In such case, the adhesive-treated blanks may be superposed and molding during the shoemaking operation, that is, with conformation of such blanks to the very last on which the shoe-upper assembly is made..

I claim:

1. A method of making counters of multi-ply structure inclusive of a ply of relatively stiff sheet material and a ply of relatively flexible sheet material, which comprises cutting said relatively stiff sheet material into a counter blank; separately cutting said relatively flexible sheet material into a larger sized counter blank; and molding the blanks under pressure to counter form in superposed relationship with cement applied between their contacting surfaces and with at least the upper and side marginal portions of said larger sized blank extending beyond the corresponding edges of the smaller sized blank; said blanks being impermanently bonded by said cement in unset condition at the start of said molding operation and hence being free to undergo relative creeping during such operation.

2. A method of making counters of multi-ply structure inclusive of a ply of relatively stiff fibrous sheet material and a ply of relatively flexible fibrous sheet material, which comprises cutting said relatively stiff material into a counter blank; skiving the edges of said blank; separately cutting said relatively flexible material into a larger sized counter blank; and molding the blanks under pressure to counter form in superposed relationship with cement applied between their contacting surfaces and with at least the upper and side marginal portions of said larger sized blank extending beyond the corresponding edges of the smaller sized blank; said blanks being impermanently bonded by said cement in unset condition at the start of said molding operation and hence being free to undergo relative creeping during such operation and said relatively flexible material affording the inner surface of the molded counter.

3. A method of making counters of multi-ply structure inclusive of a ply of relatively stiff sheet material and a ply of relatively flexible sheet material, which comprises cutting said relatively stiff sheet material into a counter blank; separately cutting said relatively flexible sheet material into a larger sized counter blank; applying cement to a face of at least one of said blanks; assembling said blanks in superposed relationship with the cement therebetween and with at least the upper and side marginal portions of said larger sized blank extending beyond the corresponding edges of the smaller sized blank; and, while the cement is still in unset state, molding said blank assembly under pressure to counter form.

4. A method of making counters of multi-ply structure inclusive of a ply of relatively stiff sheet material and a ply of relatively flexible sheet material, which comprises cutting said relatively stiff sheet material into a counter blank; skiving the edges of said blank; separately cutting said relatively flexible sheet material into a larger sized counter blank; applying cement to a face of at least one of said blanks; assembling said blanks in superposed relationship with the cement therebetween and with at least the upper and side marginal portions of said larger sized blank extending beyond the corresponding edges of the smaller sized blank; and, while the cement is still in unset state, molding said blank assembly to counter form with the flexible sheet material affording the inner surface of the molded counter.

5. A method of making counters of multi-ply structure inclusive of a relatively stiff fiberboard ply and a relatively flexible binder-impregnated felted fiber ply, which comprises cutting said relatively stiff ply into a counter blank; separately cutting said relatively flexible ply into a larger sized counter blank; humidifying both blanks with sufficient moisture to soften them markedly; applying cement to a face of at least one of said blanks; assembling said blanks in superposed relationship with the cement therebetween and with at least the upper and side marginal portions of said larger sized blank extending beyond the corresponding edges of the smaller sized blank; and, while the cement is still in unset state, molding said blank assembly under pressure to counter form.

6. A method of making counters of multi-ply structure inclusive of a relatively stiff fiberboard ply and a relatively flexible binder-impregnated felted fiber ply, which comprises cutting said relatively stiff ply into a counter blank; skiving the edges of said blank; cutting said relatively flexible ply into a larger sized counter blank; humidifying both blanks with sufficient moisture to soften them markedly; applying cement to a face of at least one of said blanks; assembling said blanks in superposed relationship with the cement therebetween and with at least the upper and side marginal portions of said larger sized blank extending beyond the corresponding edges of the smaller sized blank; and, while the cement is still in unset state, molding said blank assembly under pressure to counter form with the relatively flexible ply affording the inner surface of the molded counter.

FRED L. AYERS.